(12) United States Patent
Robinson et al.

(10) Patent No.: US 9,160,931 B2
(45) Date of Patent: Oct. 13, 2015

(54) MODIFYING CAPTURED IMAGE BASED ON USER VIEWPOINT

(75) Inventors: Ian N. Robinson, Palo Alto, CA (US); April Slayden Mitchell, Palo Alto, CA (US); Daniel G. Gelb, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/110,707

(22) PCT Filed: Apr. 8, 2011

(86) PCT No.: PCT/US2011/031833
§ 371 (c)(1),
(2), (4) Date: Oct. 8, 2013

(87) PCT Pub. No.: WO2012/138355
PCT Pub. Date: Oct. 11, 2012

(65) Prior Publication Data
US 2014/0049667 A1 Feb. 20, 2014

(51) Int. Cl.
*H04N 5/232* (2006.01)
*H04N 5/225* (2006.01)
*H04N 5/33* (2006.01)

(52) U.S. Cl.
CPC ......... *H04N 5/23296* (2013.01); *H04N 5/2251* (2013.01); *H04N 5/23293* (2013.01); *H04N 5/232* (2013.01); *H04N 5/33* (2013.01)

(58) Field of Classification Search
USPC .................................................. 348/333.03
See application file for complete search history.

(56) References Cited

U.S. PATENT DOCUMENTS

| | | | |
|---|---|---|---|
| 6,522,360 B1 * | 2/2003 | Miyawaki et al. | 348/347 |
| 7,023,483 B2 | 4/2006 | Pollard et al. | |
| 7,139,445 B2 | 11/2006 | Pilu et al. | |
| 7,860,382 B2 * | 12/2010 | Grip | 396/51 |
| 2004/0212712 A1 * | 10/2004 | Stavely et al. | 348/333.03 |
| 2006/0044399 A1 | 3/2006 | Fredlund et al. | |
| 2009/0110235 A1 | 4/2009 | Marti | |
| 2010/0026780 A1 | 2/2010 | Tico et al. | |
| 2010/0079449 A1 | 4/2010 | McCarthy | |
| 2010/0171691 A1 | 7/2010 | Cook et al. | |
| 2010/0253825 A1 | 10/2010 | Horie | |
| 2011/0216060 A1 * | 9/2011 | Weising et al. | 345/419 |
| 2014/0204003 A1 * | 7/2014 | Deering et al. | 345/8 |

FOREIGN PATENT DOCUMENTS

JP    2009-288613    12/2009

OTHER PUBLICATIONS

Written opinion and international search report for counterpart PCT patent application, PCT/US2011/031833, dated Dec. 26, 2011.
François, Alexandre RJ, and E-Ye Kang. "A handheld mirror simulation." Multimedia and Expo, 2003. ICME'03. Proceedings. 2003 International Conference on. vol. 2. IEEE, 2003.

* cited by examiner

*Primary Examiner* — Albert Cutler
(74) *Attorney, Agent, or Firm* — HP Legal Department

(57) ABSTRACT

An image capture system is described that includes: a first image capture device for capturing a first image, the first image capture device having a first field of view; a viewpoint assessment sensor having a second field of view. The image capture system also includes a viewpoint assessment component for determining the location of the user viewpoint in the second field of view and an image modification component for modifying the first image responsive to the user viewpoint in the second field of view.

6 Claims, 6 Drawing Sheets

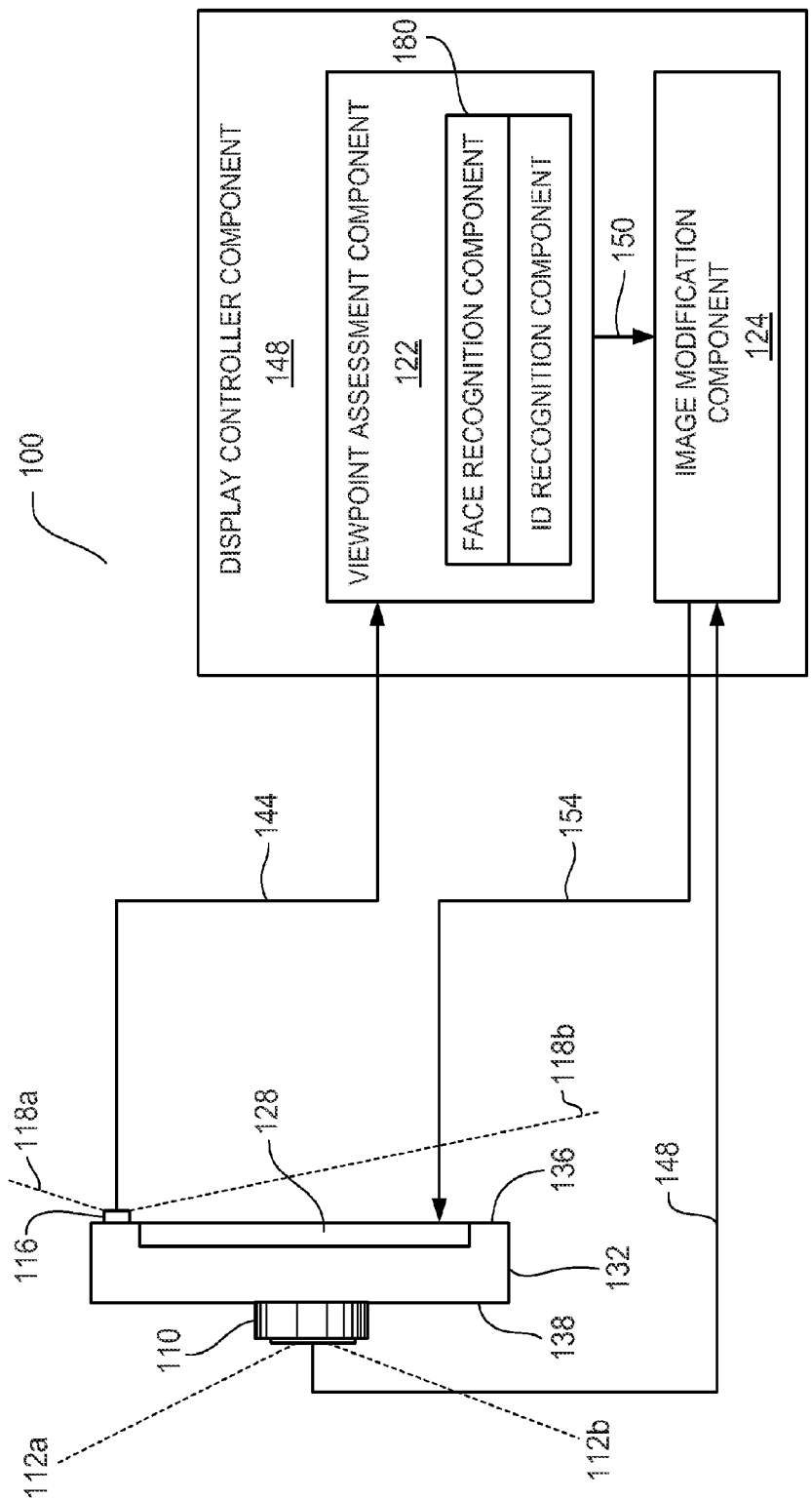

440

450 — CALCULATE THE VIEW FRUSTUM BASED ON THE USER VIEWPOINT AND THE BOUNDARIES OF THE DISPLAY DEVICE

460 — BASED ON THE CALCULATED VIEW FRUSTUM, DETERMINE A USER VIEW PORTION OF THE FIRST IMAGE THAT CORRESPONDS TO THE CALCULATED VIEW FRUSTUM

470 — MODIFY THE FIRST IMAGE TO CORRESPOND TO THE USER VIEW PORTION

*Fig. 4B*

MODIFYING CAPTURED IMAGE BASED ON USER VIEWPOINT

BACKGROUND

One step in taking a photograph or capturing video is framing of the desired image. Many cameras include an LCD display or viewfinder facing the user which displays the framed image before and after image capture. Users can, for example, adjust the image displayed in the LCD display using a combination of camera movement (the user physically moving the camera location) and zoom control to frame the desired image. For many commercially available consumer cameras, when a user raises the camera to frame a picture, the image displayed on the viewfinder does not relate to the user's view of the scene past the camera, but instead depends only on the orientation of the camera and the position of its zoom control. This mismatch between the user's and the camera's view directions can be especially problematic when the view of the viewfinder is impaired, washed out by strong sunlight, for example. Contrast this to the simple way in which a cinematographer frames a shot with their fingers: by simply moving the "frame" in front of their view, including closer to and further away from their viewpoint (to include more or less of the image respectively). They are able to directly select the view they want to capture—without recourse to additional controls such as zoom.

BRIEF DESCRIPTION OF DRAWINGS

The figures depict implementations/embodiments of the invention and not the invention itself. Some embodiments are described, by way of example, with respect to the following Figures.

FIG. 1 illustrates a block diagram of an image capture system for framing an image according to an embodiment of the invention;

FIG. 4B illustrates a flow diagram of a step of modifying the first captured image for display according to an embodiment of the invention;

Figure 2A:
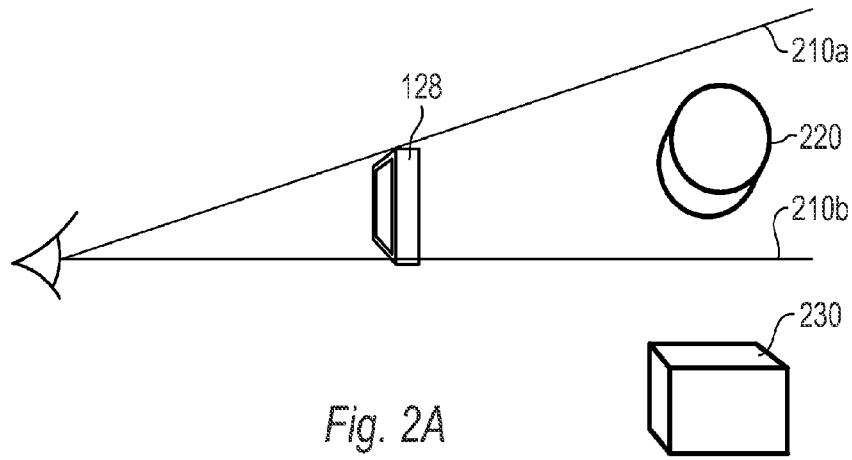
FIG. 2A illustrates a side cross-sectional view of a user eye position, where the user's eyes are in a first position relative to the image capture system of FIG. 1 according to an embodiment of the invention.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Referring to FIG. 1 shows a block diagram of an image capture system according to an embodiment of the invention. The image capture system 100 includes at least a first image capture device and at least a first viewpoint assessment sensor. In the image capture system the first image capture device captures a scene or object of interest while the viewpoint assessment sensor captures information that can be used in determining the user viewpoint. Referring to FIG. 1, the image capture system 100 is comprised of: a first image capture device 110 for capturing a first image, the first image capture device having a first field of view 112; a viewpoint assessment sensor 116 for capturing user viewpoint information, the viewpoint assessment sensor 116 having a second field of view 118; a viewpoint assessment component 122 for determining the location of the user viewpoint in the second field of view; and an image modification component 124, for modifying the first image responsive to the user viewpoint in the second field of view.

As previously stated, the image capture system 100 includes at least a first image capture device 110 and a viewpoint assessment sensor 116. In addition to the first image capture device 112 where the lens is facing the object or scene to be captured, the image capture system 100 of the present invention includes a viewpoint assessment sensor 116 for capturing the viewpoint of the user taking the photograph or video images. The viewpoint assessment sensor 116 is positioned to capture information about a user and also his position in front of the viewfinder display area 128. This additional information can be used to determine the user viewpoint. The user viewpoint information is used to modify the image of the scene captured by the first image capture device, so that the modified image appears to be from the user's viewpoint. Thus, instead of the view framed by the viewfinder display 128 being centered on the direction of the camera lens of the first image capture device 110, it is instead reflective of the viewpoint of the user taking the photograph.

A mismatch between what is displayed and what is seen by the user can occur if there is a difference between the view direction of the camera lens and the view of the scene past the camera seen by the user's eyes. A goal of the present invention is to change the viewfinder display content so that it substantially eliminates any human perceivable mismatch that occurs between what the user is viewing past the camera and what is being framed by the viewfinder display 128. Having the captured image display what the user is actually seeing provides an intuitive and easy to use interface for the user.

In one embodiment of the invention, a simple opening through the body of the camera serves as the viewfinder display 128, instead of the commonly available LCD or OLED display. The captured first image would be modified to correspond to the user's view framed by this opening in the camera. However, an embodiment that uses a conventional display screen for the viewfinder 128 has increased functionality, enabling, for example, review of captured images. During the image framing process, because the captured image is modified according to the user's viewpoint, the display would appear to simulate a rectangular opening through the camera.

The image capture device 110 or the viewpoint assessment sensor 116 may be a camera or video camera device capable of capturing an image in analog or digital form. In one embodiment, the first image capture device 110 and/or the viewpoint assessment sensors may be depth cameras. Using a depth camera provides increased flexibility with respect to the methods available for determining user viewpoint and potentially increases the accuracy of the position dependent correction methods used to provide improved modification of the first image.

The image capture system housing 132 shown has both a front surface 136 and a back surface 138, where the front and back surfaces are substantially planar and parallel to each other. The first image capture device 110 is rear facing and the lens of the camera is embedded in or extends from the first rear surface 138. The first image capture device 110 has a first field of view 112, the boundaries of which are represented by dotted lines 112a, 112b. The user positions the camera so that the field of view 112 of the lens of the first camera 110 encompasses the objects that the user wants to take a photograph or video of.

The viewpoint assessment sensor 116 is front facing and is embedded in or extends from the second front surface 136. The viewpoint assessment sensor 116 has a second field of view 118 the boundaries of which are represented by dotted lines 118a, 118b. The goal of the viewpoint assessment sensor 116 is to determine the user's viewpoint in space with respect to the camera, more specifically with respect to the plane of the viewfinder frame 128. As long as the user is in the range and field of view of the viewpoint assessment sensor, information can be extracted that can be used to determine the user viewpoint.

In one embodiment of the system shown in FIG. 1, the viewpoint assessment sensor 116 is a second image capture device positioned to face towards the user to capture the user's head location, position and/or facial details. In the embodiment shown in FIG. 1, the dotted lines 118a, 118b show the capture range or field of view of the lens of the image capture device 116. The field of view of the image capture device is dependent upon the upon the type of image capture device used and the position of the camera. Referring to FIG. 1, the data 144 from the second image capture device 116 is used by the viewpoint assessment component 120 to determine the user's viewpoint.

The display controller component 148 includes: a viewpoint assessment component 122 and an image modification component 124. The captured image data 144 from the second image capture device is input into the viewpoint assessment component 122. The second image includes image data regarding a user within the field of view of the second image capture device. Information regarding the viewpoint of the user can be extracted from the second image to determine the user viewpoint. Image information 148 from the first image capture device 110 is input into the image modification component 124. Using data 150 regarding the user viewpoint from the viewpoint assessment component 122 and data 148 from the first captured image, the image modification component 124 determines how to modify the first captured image to more closely match the user viewpoint. The modified image 154 is output to the LCD display screen 128 for viewing by the user. Thus the user, when viewing the LCD display will see the image reflective of the camera location with respect to his own viewpoint—and not the view direction of the camera lens on the rear facing side of the camera.

In one embodiment, the timing of the image capture of the first and second image capture is coordinated so that the image that is captured by the first image capture device corresponds to the user viewpoint (captured by the second image capture device) at substantially the same time t1 or within a predefined delay. This way as the user viewpoint changes, the corresponding image/scene that is seen by the user at the same time is modified.

By displaying what the user is actually seeing, the present invention is attempting to simulate the image capture of the image in front of the user as if the image capture system was transparent and the user was placing a frame in the air to capture the scene behind the frame. In many commercially available cameras, where the view captured is the view from the camera lens, the view does not change unless you change the camera position. However, in the present invention the view being captured is viewpoint dependent, if the user moves his head position, the displayed view changes.

Figure 2B:
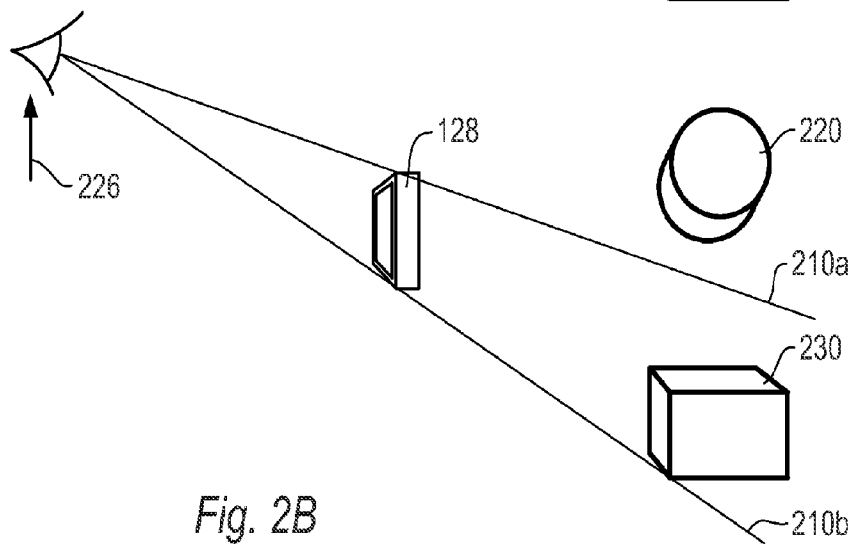
FIG. 2B illustrates a side cross-sectional view of a user eye position, where the user's eyes are in a second position relative to the image capture system of FIG. 1 according to an embodiment of the invention.
Figure 2C:
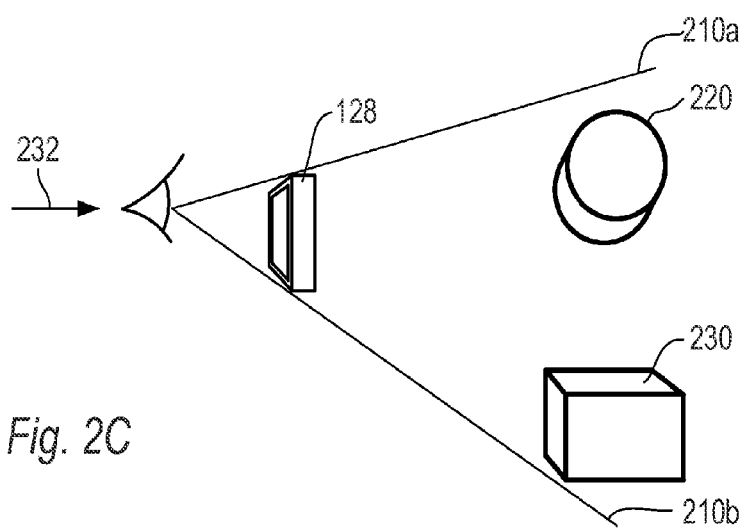
FIG. 2C illustrates a side cross-sectional view of a user eye position, where the user's eyes are in a third position relative to the image capture system of FIG. 1 according to an embodiment of the invention.

FIGS. 2A-2C illustrate how changes in the user viewpoint with respect to the image capture system changes the image captured by the system 100. FIG. 2A illustrates a side cross-sectional view of a user eye position, where the user's eyes are in a first position relative to the image capture system of FIG. 1. The lines 210a, 210b extending from the user's eyes to the side boundaries of the display screen 128 of the camera are illustrative of the boundaries of the view frustum defined by the user viewpoint and the boundaries of the plane of the viewfinder display. In the FIG. 2A, a user view frustum shown by the lines 210a, 210b, looking through the LCD display screen 128, would encompass the cylindrical object 220. The object in the view frustum—the cylinder 220—would be captured by the image capture system 100 and displayed on the display 128. However because the present invention is user viewpoint dependent, the cube 230 which is not in the user's view frustum, would not appear on the LCD display screen 128.

FIG. 2B illustrates a side cross-sectional view of a user eye position, where the user's eyes are in a second position relative to the image capture system of FIG. 1. Compared to the illustrated eye position shown in FIG. 2A, the user eye position shown in FIG. 2B is shifted upwards (see arrow 226). In the FIG. 2B, a user view frustum shown by the lines 210a, 210b, looking through the LCD display screen 128, would encompass the cube 230. The object in the view frustum—the cube 230—would be captured by the image capture system 100 and displayed on the display 128. However because the present invention is user viewpoint dependent, the cylinder 220 which is not in the user's view frustum, would not appear on the LCD display screen 128.

FIG. 2C illustrates a side cross-sectional view of a user eye position, where the user's eyes are in a third position. Relative to the embodiment shown in FIGS. 2A and 2B, the user's eye position (see arrow 232) is moved closer to the display. The user view frustum shown by the lines 210a, 210b, looking through the LCD display screen 128, would now encompass both the cylinder 220 and the cube 230. Changing the distance between the user's eyes and the display of the image capture system 100 changes the apparent zoom of the camera. Thus, for instance, moving the device closer to the user's face would have the effect of zooming the view out.

Figure 3:
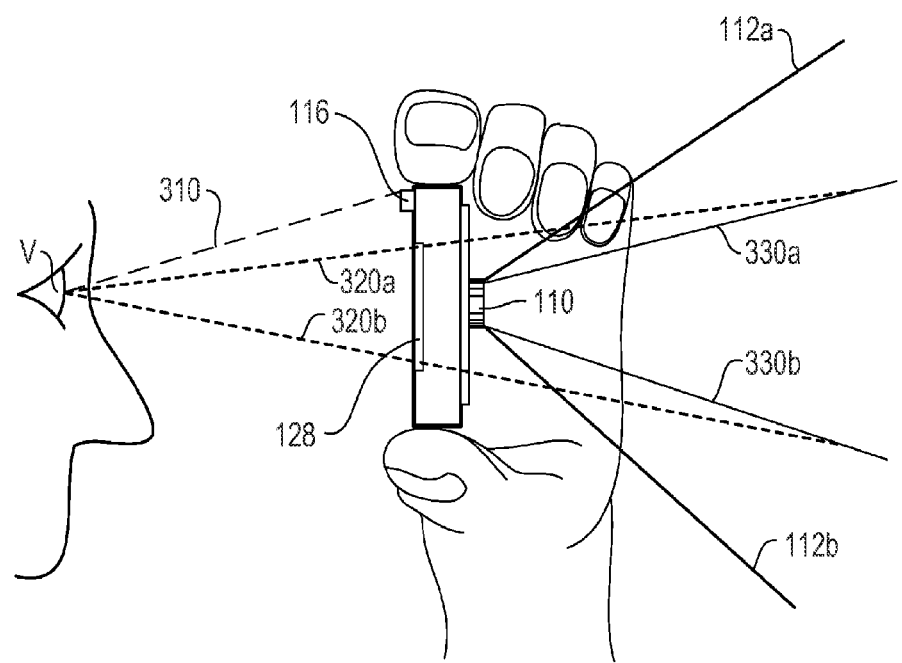
FIG. 3 illustrates a side cross-sectional view illustrating the field of view of the framing system described in FIG. 1 according to an embodiment of the invention.

FIG. 3 illustrates a side cross-sectional view illustrating the field of view of the image capture system described in FIG. 1. For the embodiments shown in FIGS. 1-3, the image that is displayed on the viewfinder display screen 128 is at least in part dependent upon a user viewpoint. In one embodiment, based both on the user viewpoint and the boundaries of the display screen 128, the display system 100 determines how to modify the first captured image. In one embodiment, the lens of the first image capture device is a wide angle lens and the first captured image is modified by only choosing the portion of the first captured image that corresponds to the user's view "through" the viewfinder display. In other words based on a user viewpoint, the displayed image presents a different view of the captured image than would be presented by the first image capture device, such that the view of the image displayed on the display matches the user's view direction with respect to the camera. Further, as the user changes his position (angle from the display screen, distance from the display screen, etc.) then his viewpoint (V) and thus the image on the display 128 changes.

Referring to FIG. 3 shows a view of the points used in one implementation to generate a viewpoint from the perspective of a user. Although different definitions of user viewpoint can be used, with respect to FIG. 1 the location of the user viewpoint is described (for purposes of discussion only) as the position (V) located midway between the user's two eyes. Referring to FIG. 3, the dotted line 310 is representative of the line between the camera lens of the second image capture device and the user viewpoint. Although the term "user" is used throughout, when used with respect to the viewpoint assessment sensors, the term user refers to the features of the user (eyes, head and shoulders, face, etc.) necessary for the viewpoint assessment component, to determine the user viewpoint. Eye position or location can be found using various techniques including through the user of face detection software or by approximation from the position of a tracking device being worn by the user.

In one embodiment, determining the user's eye position is found using IR (infrared) illumination. In this implementation, an IR illumination source floods IR light in the vicinity of the user. In this case, the viewpoint assessment sensor 1 116 is an IR sensitive device, typically an IR sensitive camera. IR light is reflected off the user's retina and the IR sensitive camera (the viewpoint assessment sensor) captures the user's eye location relative to the display screen and the object positioned behind the display screen. Based on the location of the user's eyes, the viewpoint assessment component determines the user's viewpoint with respect to the screen and the object.

In an alternative embodiment, information about the user's eye position (used to determine the user's viewpoint) can be achieved using face detection software 180. In this case, the viewpoint assessment sensor 116 can be simple cameras. Based on the feature detection software 180 in the viewpoint assessment component 122, the eye position of the user is located. Based on the eye position of the user, the user viewpoint can be determined.

In an alternative embodiment, some force of active tracking of the user's position is used. For example, the user could wear a device that is capable of being tracked in 3D space. In one implementation, retro-reflective markers could be applied to an object worn by the user (i.e. a headset, a pair of glasses, etc.). Based on the position of the tracked object, the viewpoint assessment component software 116 provides an accurate approximation of the user's eye location. In another embodiment, the user could wear a device that emits a sound that would allow the user to be tracked in 3D space.

In another alternative embodiment, the eye location of the user can be approximated using depth cameras as the viewpoint assessment sensor 116. Depth cameras can include sensors that compute depth from stereo, depth from IR time-of-flight, or depth from observing projected IR structured light. In this implementation, a depth camera is used to locate the user (user's head and shoulder at a depth or depth range nearer to the depth camera) and the background (at a depth or depth range further from the camera). The viewpoint location can then be approximated as being at the center of the head shaped region in the depth image. Any of the above techniques listed in the preceding paragraphs can be combined to give a more accurate determination of the viewpoint location.

Figure 4A:
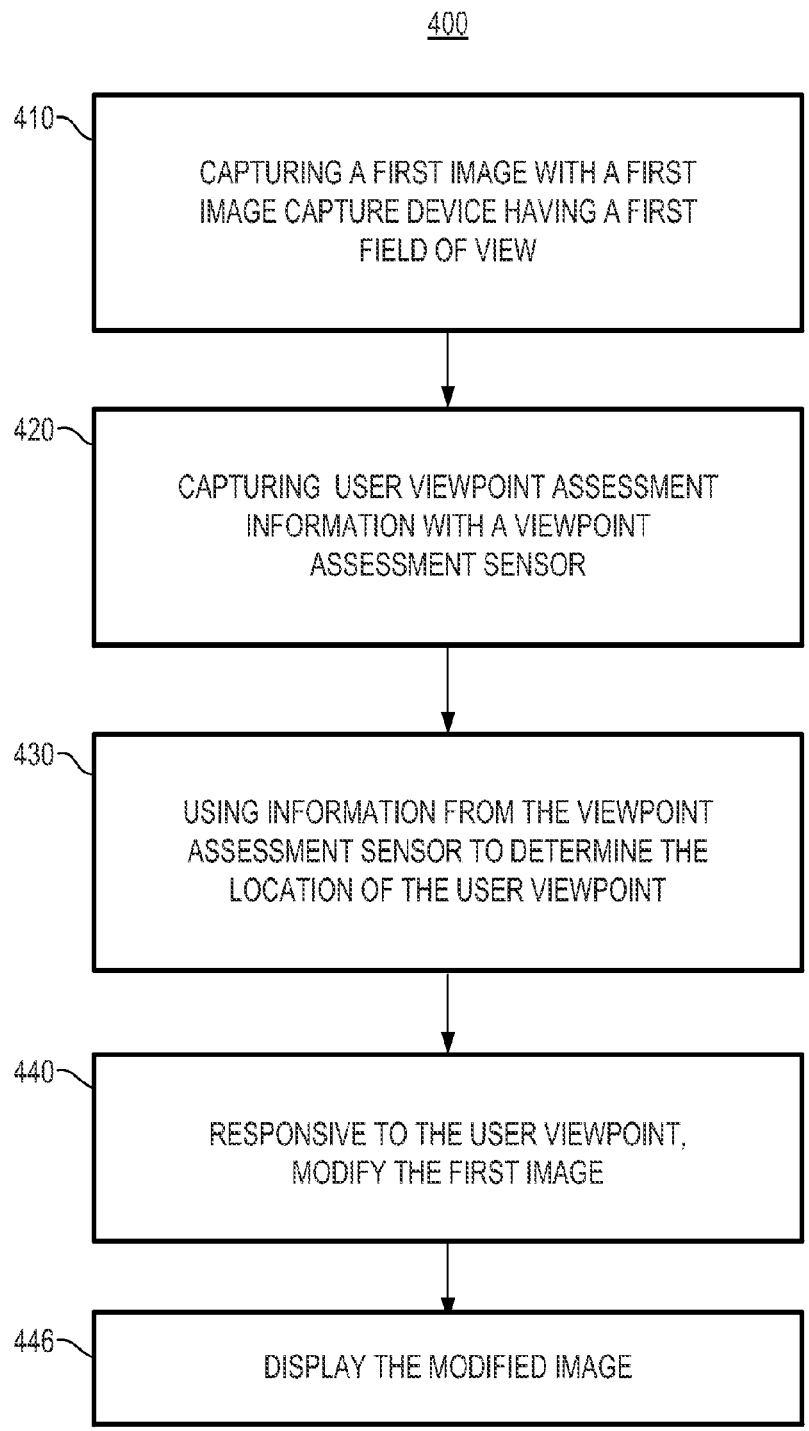
FIG. 4A illustrates a flow diagram of a method of framing an image for display according to an embodiment of the invention.

FIG. 4A illustrates a flow diagram of a method of framing an image for display according to an embodiment of the invention; FIG. 4A illustrates a flow diagram of a method of framing an image for display according to an embodiment of the invention. The method for framing an image for display includes the steps of: capturing a first image with a first image device, the first image capture device having a first field of view (410); capturing viewpoint assessment information with a viewpoint assessment sensor, the viewpoint assessment sensor having a second field of view (step 420); using viewpoint assessment information to determine the location of the user viewpoint (430); and responsive to the user viewpoint, modifying the first image (440). In one embodiment, the modified image is then displayed (446) on the display screen 128 of the image capture system 100.

The method shown in FIGS. 4A and 4B are described generally with reference to the image capture system, shown in FIG. 3. Regarding FIG. 4A, step 410 shows the step of capturing a first image with a first image capture device 110 having a first field of view 112. In FIG. 3, the boundaries of the first field of view are represented by lines 112*a* and 112*b*.

Referring to FIG. 4A, step 420 is the step of capturing viewpoint assessment information with a viewpoint assessment sensor having a second field of view. This step covers multiple types of sensors that can be used to capture or gather information that can be used for determining user viewpoint. In one embodiment, the viewpoint assessment sensor 116 is an ultrasound sensor and active tracking of the user is used to determine the user viewpoint. For the case of an ultrasound sensor, the field of view is the capture zone of the sensor. For the case where the viewpoint assessment sensor is an image capture device, then the captured viewpoint assessment information is a second captured image. For the embodiment shown in FIG. 3 where the viewpoint assessment sensor is an image capture device, the boundaries of the second field of view of the second image capture device 116 are represented by lines 118*a* and 118*b*.

Referring to step 430, after capturing viewpoint assessment information from the sensor, the viewpoint assessment information is used to determine the user viewpoint. In step 430, for the embodiment where the viewpoint assessment sensor is an image capture device—the front-facing camera (the second image capture device) is used to ascertain the user's viewpoint. However, different systems and methods for determining the user's eye position and viewpoint may be used. For example, in one embodiment, is the determination of the user viewpoint is achieved by using a face detector software 180 on the output of the front-facing camera to determine user eye location and from user eye location—the user viewpoint. In other embodiments, other techniques are used to determine the user viewpoint including techniques such as, but not limited to the techniques discussed with reference to FIG. 3 including the following: using a pair of front-facing cameras could supply depth from stereo when the assumption is that the nearest object is the user's head; a camera could be augmented using a depth sensor (ultrasound, structured light, or time-of-flight, for instance), information captured by the depth sensor could then be used to match a 3D face to determine user viewpoint in 3D; a wearable headset could be augmented to assist in locating the user's head (e.g. act as an IR or ultrasound beacon). From the output image 144, the position of the user's eyes and thus the location of the user's viewpoint can be established. The location and size of the face in the image is used to calculate the viewpoint in three dimensions relative to the device.

Referring to FIG. 4B, step 440 of FIG. 4A is expanded to provide further detail regarding step (440) of modifying the first captured image for display, for the case where the viewpoint assessment sensor is an image capture device. In one embodiment, the first image is modified by: calculating the view frustum (320 in FIG. 3) based on the user viewpoint and the boundaries of the display (step 450); based on the calculated view frustum, determining a user view portion of the first image that corresponds to the calculated view frustum (330 in FIG. 3) (460); and modifying the first image to correspond to the user view portion (470).

In expanding the detail of step 440 shown in FIG. 4B, once the user's viewpoint with respect to the display is known, than a view frustum can be calculated (450) using the known user viewpoint and the boundaries of the device display 128. With reference to the image capture system shown in FIG. 3, the apex of the view frustum is the viewpoint (V). The view frustum is defined by the apex (V) and the boundaries of the display screen 128. In the embodiment shown in FIG. 3, the boundaries of the user's view frustum are represented by dotted lines 320a and 320b.

Referring to FIG. 4B, once the view frustum is calculated, a user view portion of the first image is determined that corresponds to the calculated view frustum. The user view portion is a portion of the first image that is within the field of view of the first image capture device that corresponds to the view frustum boundaries 320a, 320b. In one embodiment, the goal is to define the user view portion of the first image that corresponds to or approximately matches the boundaries of the user view frustum 320a, 320b. In the embodiment shown in FIG. 3, the portion of the first image that corresponds to the boundaries 330a and 330b is chosen as being a close match.

For the user view portion (the portion of the image falling within the boundaries 330a, 330b) chosen for the embodiment shown in FIG. 3, the user view portion is selected from the image information in the first field of view (112a, 112b) that approximates the user's field of view 320a, 320b in the first image. For the embodiment shown, this match is an approximation since the portion of the first image selected within the boundaries 330a and 330a does not include all of the image information in the user view frustum. Different techniques which select more or less of the first image may be selected, however, some techniques may be more computational intensive and simpler techniques may be chosen. For example, if the user is photographing a landscape that is very far away then the angle between 330a/330b will be very close to the angle 320a/320b. However if the user is photographing something closer then they may be wider to try and capture what the user sees. Information on the distance of objects in a scene normally obtained by a typical camera system to enable automatic focusing can be used to determine how far out the lines 320 and 330 should intersect. Further, because the boundaries of the user view frustum 320a, 320b may not fall completely within the boundaries of the first field of view, the user view portion may not include all of the image information that falls within the user view frustum boundaries since this information may not be captured by the first image capture device. However, the goal is to include as much of the image information encompassed by the user view frustum as possible.

In one embodiment, the first image capture device 110 may have an optical zoom capability. In this case the image modification component 124 could control the amount of optical zoom (the angle between 112a and 112b in FIG. 3) to maximize the image sensor area corresponding to the user view frustum. For example, in FIG. 3, the field of view of the lens could be reduced (zooming in) to more closely match the view frustum 330.

Referring to FIG. 4A, once the modified image is created, it is displayed on the display screen 128. The displayed image is reflective of the user's viewpoint. In one embodiment, the image capture system includes an interface for modifying the display so that the displayed image presents a wider or narrower field of view than the user's view frustum.

In one embodiment, the image capture system switches between display modes dependent upon whether the user's eyes/face or detected. For example, in the case where the image capture system might be positioned high above the user's face to shoot over a crowd, for example—the image capture system would not detect the user's face. In this case, the image capture system would switch between a mode which displays a modified image reflective of the user viewpoint according to the present invention, to a conventional display output mode which simply displays the first image.

Figure 5:
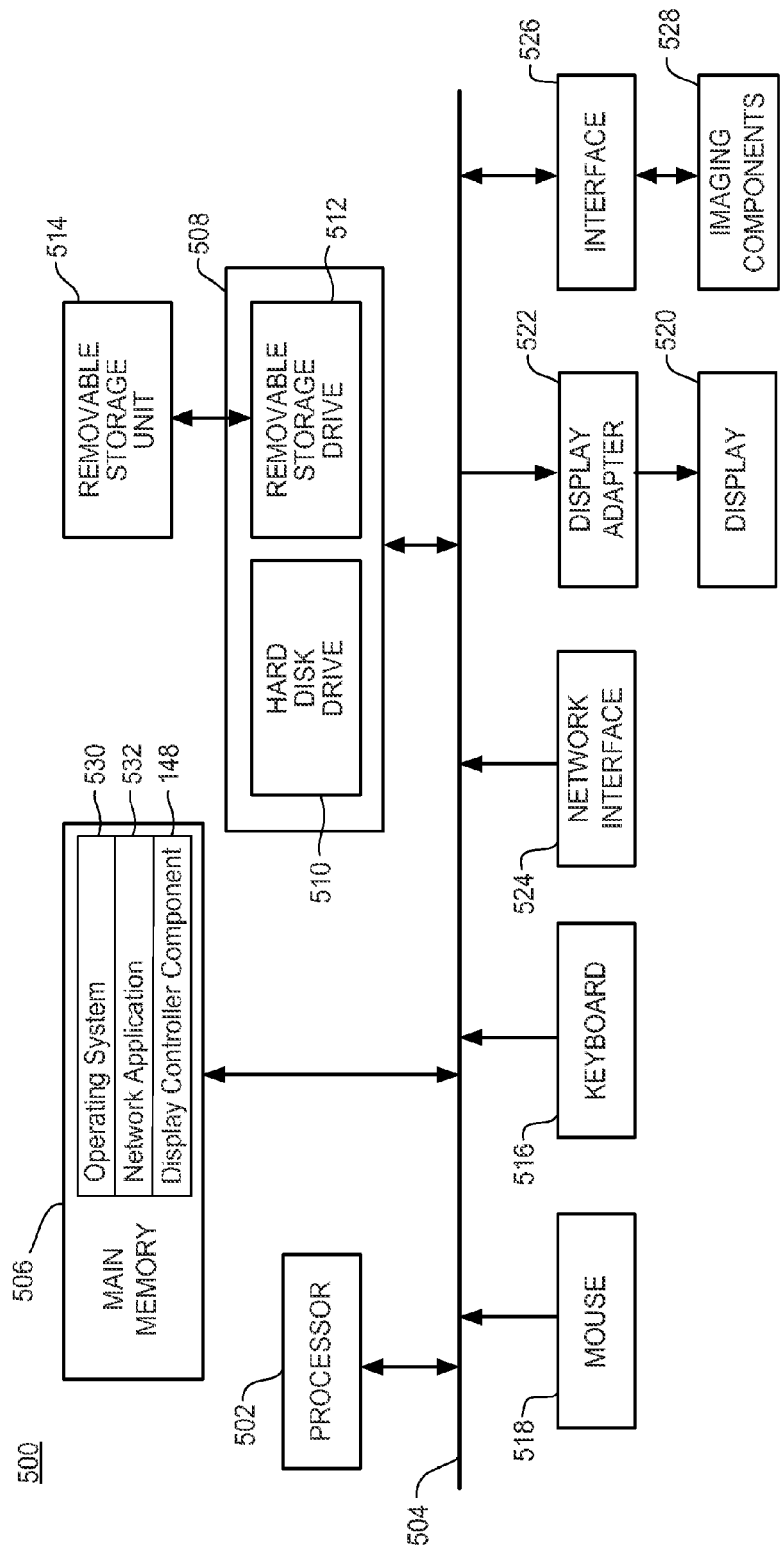
FIG. 5 shows a computer system for implementing the method shown in FIGS. 4A and 4B described in accordance with embodiments of the present invention.

FIG. 5 shows a computer system for implementing the methods shown in FIGS. 4A-4B and described in accordance with embodiments of the present invention. It should be apparent to those of ordinary skill in the art that the method 400 represents generalized illustrations and that other steps may be added or existing steps may be removed, modified or rearranged without departing from the scopes of the method 400. The descriptions of the method 400 are made with reference to the system 100 illustrated in FIG. 1 and the system 500 illustrated in FIG. 5 and thus refers to the elements cited therein. It should, however, be understood that the method 400 is not limited to the elements set forth in the system 500. Instead, it should be understood that the method 400 may be practiced by a system having a different configuration than that set forth in the system 500.

Some or all of the operations set forth in the method 400 may be contained as utilities, programs or subprograms, in any desired computer accessible medium. In addition, the method 400 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

FIG. 5 illustrates a block diagram of a computing apparatus 500 configured to implement or execute the methods 400 depicted in FIGS. 4A and 4B and described in accordance with embodiments of the present invention. In this respect, the computing apparatus 500 may be used as a platform for executing one or more of the functions described hereinabove with respect to the display controller component 130.

The computing apparatus 500 includes one or more processor(s) 502 that may implement or execute some or all of the steps described in the methods 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard drives 510 and/or a removable storage drive 512, representing a removable flash memory card, etc., where a copy of the program code for the method 400 may be stored. The removable storage drive 512 reads from and/or writes to a removable storage unit 514 in a well-known manner.

These methods, functions and other steps may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download.

In a sense, the Internet itself is a computer readable medium. The same is true of computer networks in general. It is therefore to be understood that any electronic device and/or system capable of executing the functions of the above-described embodiments are encompassed by the present invention.

Although shown stored on main memory 506, any of the memory components described 506, 508, 514 may also store an operating system 530, such as Mac OS, MS Windows, Unix, or Linux; network applications 532; and a display controller component 148. The operating system 530 may be multi-participant, multiprocessing, multitasking, multi-threading, real-time and the like. The operating system 530 may also perform basic tasks such as recognizing input from input devices, such as a keyboard or a keypad; sending output to the display 520; controlling peripheral devices, such as disk drives, printers, image capture device; and managing traffic on the one or more buses 504. The network applications 532 includes various components for establishing and maintaining network connections, such as software for implementing communication protocols including TCP/IP, HTTP, Ethernet, USB, and FireWire.

The computing apparatus 500 may also include an input devices 516, such as a keyboard, a keypad, functional keys, etc., a pointing device, such as a tracking ball, cursors, etc., and a display(s) 520, such as the LCD screen display 128 shown for Example in FIG. 1. A display adaptor 522 may interface with the communication bus 504 and the display 520 and may receive display data from the processor 502 and convert the display data into display commands for the display 520.

The processor(s) 502 may communicate over a network, for instance, a cellular network, the Internet, LAN, etc., through one or more network interfaces 524 such as a Local Area Network LAN, a wireless 802.11x LAN, a 3G mobile WAN or a WiMax WAN. In addition, an interface 526 may be used to receive an image or sequence of images from imaging components 528, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. An image capture system comprising:
    a first image capture device for capturing a first image, the first image capture device having a first field of view;
    a viewpoint assessment sensor having a second field of view;
    a viewpoint assessment component for determining the location of a user viewpoint using data captured by the viewpoint assessment sensor; and
    an image modification component, for modifying the first image responsive to the user viewpoint in the second field of view, by reducing the first image to a portion thereof in correspondence with the location of the user viewpoint,
    wherein the first image is reduced to the portion where boundaries of a user view frustum and boundaries of the first field of view intersect, the user view frustum calculated based on the user viewpoint, the first field of view calculated based on distance information that the first image capture device uses to perform automatic focus when capturing the first.

2. The image capture system in claim 1, wherein the viewpoint assessment sensor is a second image capture device.

3. A method of modifying an image comprising:
    capturing a first image with a first image capture device, the first image capture device having a first field of view;
    capturing user viewpoint assessment information with a viewpoint assessment sensor, the viewpoint assessment sensor having a second field of view;
    using the information from the viewpoint assessment sensor to determine the location of the user viewpoint; and
    responsive to the user viewpoint, reducing the first image to a portion thereof in correspondence with a calculated user view frustum that is smaller than the first field of view,
    wherein the first image is reduced to the portion where boundaries of a user view frustum and boundaries of the first field of view intersect, the user view frustum calculated based on the user viewpoint, the first field of view calculated based on distance information that the first image capture device uses to perform automatic focus when capturing the first image.

4. The method recited in claim 3 further including the step of displaying the reduced first image.

5. A non-transitory computer readable storage medium having computer readable program instructions stored thereon for causing a computer system to perform instructions, the instructions comprising the steps of:
    capturing a first image with a first image capture device, the first image capture device having a first field of view;
    capturing user viewpoint assessment information with a viewpoint assessment sensor, the viewpoint assessment sensor having a second field of view, the viewpoint assessment sensor being one of a three-dimensional (3D) space tracking device providing the user viewpoint assessment information as tracking information of the user, an infrared (IR) sensor providing the user viewpoint assessment information as infrared user viewpoint assessment information, and an ultrasonic sensor providing the user viewpoint assessment information as ultrasonic user viewpoint assessment information;
    using the information from the viewpoint assessment sensor to determine the location of the user viewpoint; and
    responsive to the user viewpoint, modifying the first image, wherein the first image is reduced to a portion thereof where boundaries of a user view frustum and boundaries of the first field of view intersect, the user view frustum calculated based on the user viewpoint, the first field of view calculated based on distance information that the first image capture device uses to perform automatic focus when capturing the first image.

6. The computer readable medium recited in claim 5 further including the step of displaying the modified first image.

* * * * *

UNITED STATES PATENT AND TRADEMARK OFFICE
CERTIFICATE OF CORRECTION

PATENT NO. : 9,160,931 B2  
APPLICATION NO. : 14/110707  
DATED : October 13, 2015  
INVENTOR(S) : Ian N. Robinson et al.

Page 1 of 1

It is certified that error appears in the above-identified patent and that said Letters Patent is hereby corrected as shown below:

IN THE CLAIMS

In column 10, line 10, in Claim 1, delete "first." and insert -- first image. --, therefor.

Signed and Sealed this
First Day of March, 2016

Michelle K. Lee
*Director of the United States Patent and Trademark Office*